United States Patent
Caya et al.

[11] Patent Number: 6,133,695
[45] Date of Patent: Oct. 17, 2000

[54] LAMP WITH SAFETY FEATURES

[76] Inventors: Dennis Caya, 475 Madison St., Wrentham, Mass. 02093; Chan K. Fai, 6/F Kenning Industrial Bldg., 19 Wang Hoi Road, Kowloon Bay, The Hong Kong Special Administrative Region of the People's Republic of China

[21] Appl. No.: 08/946,164

[22] Filed: Oct. 7, 1997

Related U.S. Application Data

[63] Continuation-in-part of application No. 08/910,982, Aug. 7, 1997.
[60] Provisional application No. 60/027,939, Oct. 11, 1996.

[51] Int. Cl.⁷ ........................................................ H01J 7/24
[52] U.S. Cl. .......................... 315/119; 315/118; 315/159; 315/309
[58] Field of Search .................... 315/119, 159, 315/309, 118

[56] References Cited

U.S. PATENT DOCUMENTS

| | | | |
|---|---|---|---|
| 4,449,074 | 5/1984 | Luchaco | 315/159 |
| 4,694,223 | 9/1987 | Campolo | 315/309 X |
| 5,800,052 | 9/1998 | Yeh | 362/376 |
| 5,863,111 | 1/1999 | Turner et al. | 315/118 X |

*Primary Examiner*—Justin P. Bettendorf
*Attorney, Agent, or Firm*—Joseph J. Zito; Kendal M. Sheets

[57] ABSTRACT

A lamp incorporating one or more safety features for reducing the risk of fire or heat damage associated with improper operation of the lamp. One safety feature can be an automatic safety switch for terminating power to the lamp when the lamp is not in a proper operational orientation. The switch is mounted on the underside of the base of the lamp and only provides electricity to the lamp when the weight of the lamp rests properly on its base. A thermal switch which reduces or eliminates power to the lamp when the lamp is operating above a predetermined temperature can be provided, alone or in combination with a light level senor to adjust lamp power in response to room lighting conditions.

13 Claims, 13 Drawing Sheets

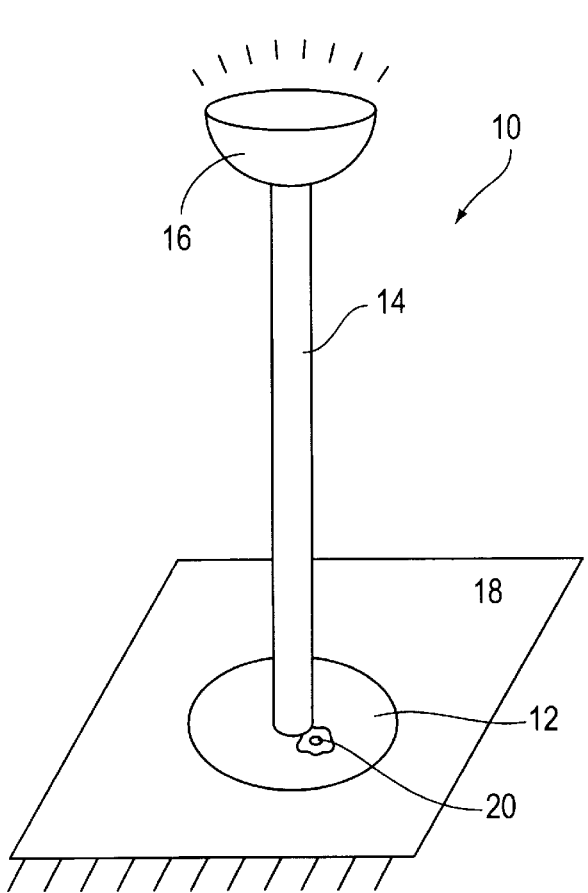
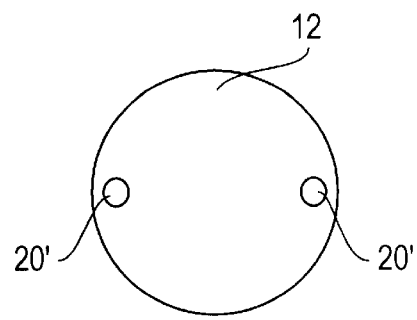
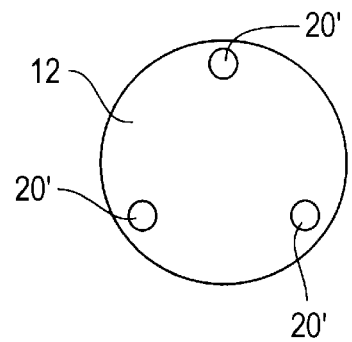
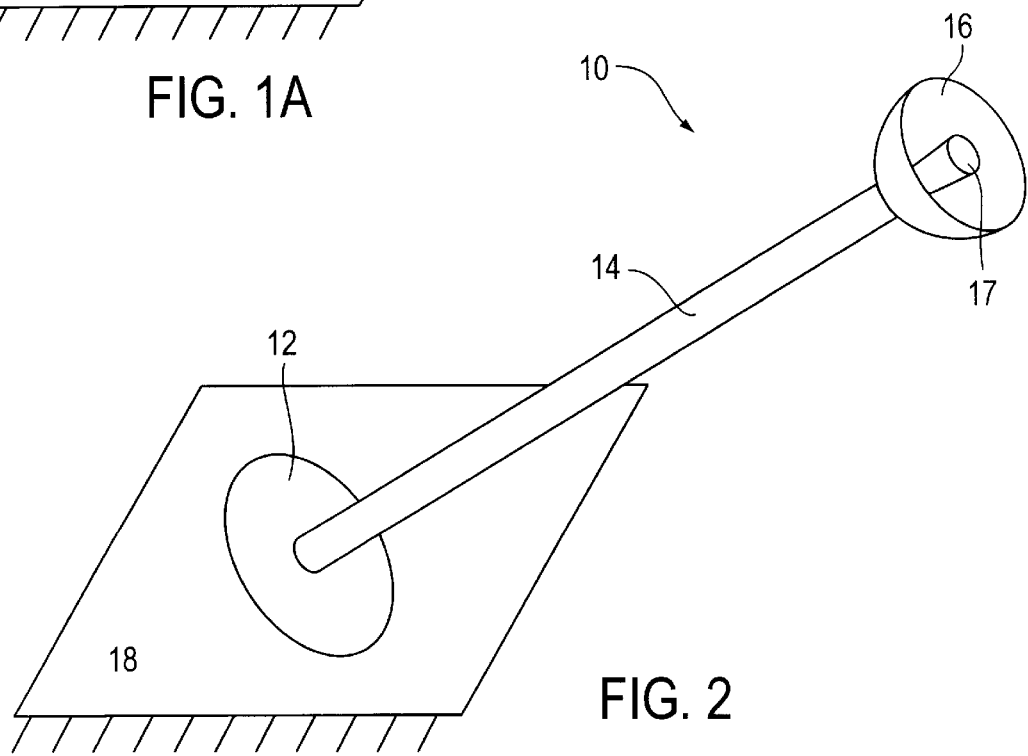
FIG. 1A
FIG. 1B
FIG. 1C
FIG. 2

LAMP WITH SAFETY FEATURES

CROSS REFERENCE TO RELATED APPLICATIONS

This application is a continuation-in-part of currently pending application Ser. No. 08/910,982, filed Aug. 7, 1997 and claims priority to provisional application No. 60/027,939, filed Oct. 11, 1996.

BACKGROUND OF THE INVENTION

The present invention relates to safety switches for electric lamps. More specifically, the present invention relates to safety switches designed to turn off or reduce the power to the bulb of a lamp in order to avoid a hazardous condition.

It has been recently recognized, especially with the increased use of halogen lamps, that lamp bulbs, which produce a significant amount of heat in addition to light, can present a fire hazard under certain non-standard use conditions. Safety standards, providing performance criteria, include measuring the temperature profile of a lamp when covered by a flammable foreign object, cloth or material and the ability to avoid a hazard if tipped over must be met by current lamps.

Lamps, especially vertically oriented lamps such as floor lamps, table lamps and torchiere style lamps, can be tipped over or knocked off of tables. If the bulb and/or its surrounding structure comes in contact with flammable material such as carpet, upholstery or drapes, a potential fire hazard is created. Even after a lamp is tipped over, the bulb will continue to be supplied with electricity and will continue to generate heat, contributing to the fire potential. If the bulb breaks, an electrical hazard is also created.

Many lamps, including halogen torchiere lamps are commonly equipped with electronic dimmers. The fundamental component of such a dimmer is a triac. Many different control circuits have been invented to mate with a triac. One circuit is a phase-cut control circuit that comprises a potentiometer, a capacitor and a trigger diode. China Patent CN 94 213163.0 discloses a type of such a control circuit.

It can be desirable to further control the phase control circuit in order to reduce the power consumption and heat generated by halogen lamps. Therefore, in addition to the simple phase control circuit, including the triac, the potentiometer, the capacitor and the trigger diode, an additional electronic control circuit can be added.

Control circuits used to control the typical triac dimmer have been disclosed. In U.S. Pat. No. 4,751,433 a photocell is used to make the luminous energy emitted from the lamp inversely proportional to the luminous intensity of the surrounding space. The critical point (action point) of this control device is set by the manufacturer, therefore, the consumer is unable to reset or adjust the device. In U.S. Pat. No. 4,658,129, a photoelectric sensing unit is used to deliver an output voltage in response to changes of the intensity of light. The output voltage is applied to a capacitor for operating an SCR in order to automatically control the ON/OFF status of the lamp.

If one room has light-colored furniture and ceilings and another room has dark-colored furniture and ceilings, the same halogen torchiere lamp placed in both rooms with the same power output, for example, 300 Watts, will cause quite different surrounding brightness. If the "action point" had been pre-set by the manufacturer, no adjustment can be made by the customer himself. The auto-control device of existing halogen torchiere lamps will be triggered at inappropriate times in both cases.

SUMMARY OF THE INVENTION

It is an object of the invention to provide enhanced safety of operation for lamps by reducing the risk of fire and electrical hazard associated with a fallen lamp.

It is an object of the invention to provide a lamp which will exceed the safety requirements to prevent lamp hazards.

It is an object of the present invention automatically to disconnect power to a bulb of a lamp when the lamp is disturbed from its proper orientation. Loss of power will eliminate additional heat generation by the bulb and eliminate the potential shock hazard in the event that the lamp has become damaged or the wiring shorted to the conducting components of the lamp.

It is an object of the present invention to provide a safety switch which will operate automatically to reduce or disconnect power to a bulb of a lamp when temperature and/or luminescence exceed proscribed levels.

The present invention relates to a combination automatic and manual electronic arrangement for controlling a standing lamp to reduce the hazards associated with operation of the lamp. More specifically, the invention relates to control of vertically oriented standing lamps, such as halogen torchiere lamps, dependent upon the proper orientation of the lamp, the brightness of the surrounding light and/or the increased ambient temperature of the Lamp.

One exemplary embodiment of a lamp with a tip over safety switch as taught in the exemplary embodiment described herein includes an automatic disconnect switch mounted to the underside of the base of a lamp. When the lamp is in an upright position, the base of the lamp rests on the switch and allows power to flow to the lamp bulb. If the lamp is tipped over or otherwise upset from its proper orientation of resting on its base, the switch opens and power to the bulb is removed. Power to the bulb is removed, to reduce the risk of fire and/or electrical hazard which can occur if the bulb comes in contact with flammable materials or if the bulb is broken when the lamp falls.

To avoid the lighting control problems of the prior art mentioned above and to provide a halogen torchiere lamp with a control device that can automatically and manually control the halogen torchiere lamp in accordance with the desired surrounding brightness and consistent with the desired ambient temperature of the lamp, the halogen torchiere lamp of this invention can be adjusted or set by the user to any intended action point and the halogen torchiere lamp will then automatically act at this point.

One exemplary embodiment of a light responsive lamp in accordance with the present invention includes two main circuits, the first of which is a typical circuit of a traditional dimmer and the second of which is the inventive circuit used to control the triac of the traditional dimmer according to the intention of the user.

The inventive circuit includes:

a DC power supply with a diode for half-wave rectifying the AC supply, a capacitor to filter said rectified current, and a Zener diode used to supply stable 6V DC; and an electronic switch with an IC used an a phase-reverser for both transistors (Q3/Q5), and two transistors (Q3/Q5) used to control ON/OFF of the triac; and a light control portion with a photoresistor used to sense the selected surrounding brightness (reference luminous), an IC used to output signal voltage per brightness sensed by the photoresistor and a potentiometer used by the customer to adjust/reset the light control portion;

the lamp can also include a temperature control with a thermal resistor to sense the temperature of the lamp, two IC's used to turn over the signal lever from the thermal resistor and control the IC of the light control portion, and a potentiometer used by the customer to adjust the temperature control portion.

BRIEF DESCRIPTION OF THE DRAWINGS

For a better understanding of the nature of the present invention, reference is had to the following figures and detailed description, wherein like elements are accorded like reference numerals, and wherein:

FIG. 1A is a perspective view of a first torchiere style lamp of the present invention in proper orientation, with a cut-away illustrating the switch placement.

FIG. 1B and 1C are bottom planer views of the lower face of the base of a lamp of the present invention illustrating alternative switch placement.

FIG. 2 is a perspective view of the lamp of FIG. 1, disturbed from its proper orientation.

DETAILED DESCRIPTION OF PREFERRED EXEMPLARY EMBODIMENTS

Figure 3:
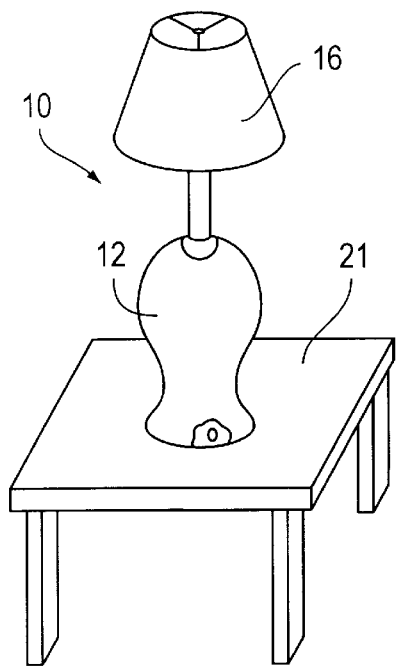
FIG. 3 is a perspective view of a second lamp of the present invention on a table with a cut-away illustrating the switch placement.

FIG. 1A illustrates a lamp 10 of the present invention in the torchiere lamp style. The lamp 10 includes a base 12, a body 14, a bulb reflector and a bulb 17 (illustrated in FIG. 2) within the shade 16. When in a proper upright orientation, FIG. 1, the lamp base 12 rests on the floor 18 and the body is vertical with the shade 16 and bulb 17 suspended above the floor 18. During operation, electricity is supplied to the bulb 17, providing light and heating bulb 17 and reflector.

FIG. 3 illustrates a lamp 10 on a table 21, the lamp 10 includes a base 12, a bulb, a shade 16 and a switch 20.

FIG. 2 illustrates the lamp 10 of FIG. 1 upset from proper vertical upright orientation. In a standard lamp, electricity supplied to the bulb 17 will continue to heat the bulb 17, reflector and shade 16, even after the lamp is upset. If the shade 16, reflector or bulb 17 rests on the floor or against furniture, drapes, bedding or other flammable material, it can present a fire and electrical hazard. A broken bulb can present an electrical danger and possibly result in an electrical fire.

To minimize the hazard presented in a lamp disturbed from its proper vertical orientation, a switch 20 is provided in the base 12 of the lamp 10 of the present invention. The switch 20 can be located at any position on the underside or rim of base 12 of the lamp 10, provided that the weight of the lamp 10 in the upright orientation holds the switch 20 closed. The switch is preferably mounted near the edge of the base 12 to react more quickly to even small changes in lamp orientation, such as a lamp tilted against a wall or drapery. However, if it is preferable for the lamp 10 to remain on unless severely tilted, the switch can be placed closer to the center of the base 12. The lamp can be provided with more than one switch along the underside edge of the base of the lamp. A plurality of switches 20' can be arranged with two switches having 180 degrees of separation as illustrated in FIG. 1B, three switches 20' having 120 degrees of separation as illustrated FIG. 1C, four switches having 90 degrees separation, or any desirable displacement and combination. The plurality switches 20' are connected in series so that opening of any one switch will disconnect the power to bulb 17. Accordingly, the provision of plural switches on the underside or rim of the base 12 allows a tip in any direction to be readily detected.

Figure 5:
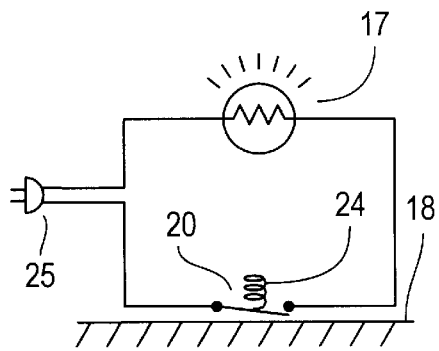
FIG. 5 is a diagrammatic view illustrating the wiring of the lamp and switch when in a proper orientation.
Figure 6:
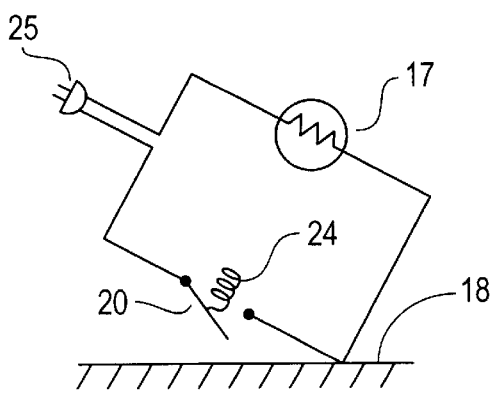
FIG. 6 is a diagrammatic view illustrating the wiring of the lamp and switch when disturbed from a proper orientation.
Figure 4:
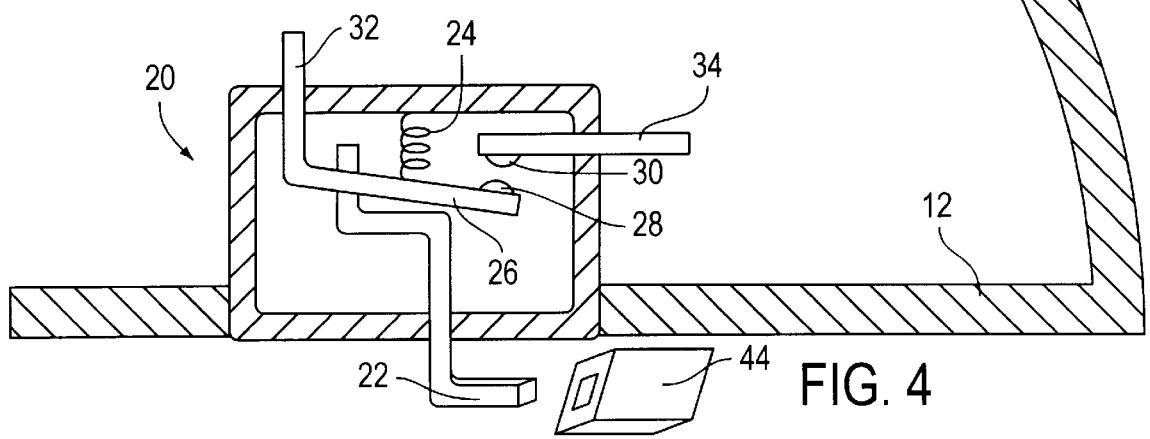
FIG. 4 is a detail view of a first embodiment of the switch of the present invention installed in a lamp base.
Figure 7A:
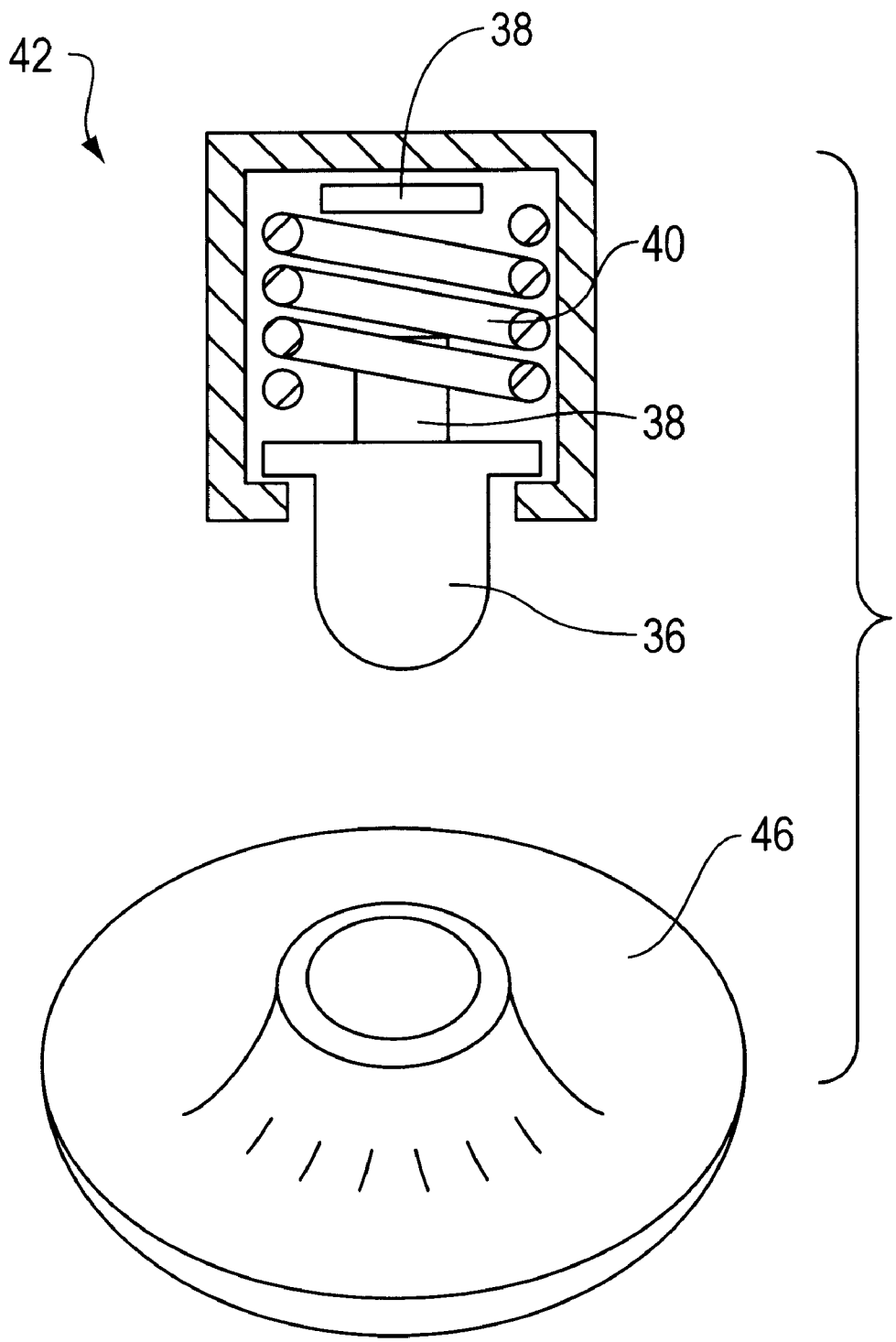
FIGS. 7A through 7C are cross sectional and perspective views of alternative switch embodiments of the present invention.

As better illustrated in FIGS. 4, 5 and 6, the switch 20 is, in an exemplary embodiment, a normally open switch with a lever actuator arm 22 biased into a open position by spring 24. FIG. 7A illustrates an exemplary alternative embodiment of a normally open push button switch. FIG. 7A is a cross sectional view of a push button switch 42 with an actuator 36, a pair of contacts 38 and an open circuit spring bias 40. The switch 42 is mounted to the underside of the base of the lamp, as previously taught and is only closed when the weight of the lamp rests on the base, forcing the actuator 36 upward against spring bias 40 to close contacts 38.

Switch 20 or 42 is positioned on base 12 so that switch 20 is held in a closed circuit condition, FIG. 5, by the weight of the lamp 10. FIGS. 4 and 6 illustrate the normally open circuit condition of switch 20. Spring 24 biases contact arm 26 downward so that contact 28 is separated from contact 30. When the lamp base rests on a solid surface, FIGS. 1, 3 and 5, actuator arm 22 moves upward, moving contact arm 26 upward, overcoming spring bias 24 and closing contacts 28 and 30. Current can then flow from electrical source 25, through switch 20 to bulb 17. The closing of switch 20 forms a conductive path between leads 32 and 34 of switch 20, FIG. 4, or a conductive path accomplished by closing of contacts 38, FIG. 7A.

Each of the switches 20 and 42 have an actuator member which contacts the surface supporting the lamp 10. The actuator can typically be an arm or button, as illustrated. When the lamp 10 is positioned on certain soft surfaces, such as deep pile or shag carpeting, it may be desirable to enlarge the surface area of the actuator in contact with the supporting surface. This can be accomplished by widening the end of the contact arm or, for example, by provision of a wide foot 44 or 46, such as illustrated in FIG. 4 and 7A respectively, which can be attached to the contact end of the actuator 22 or 36 respectively.

Figure 7B:
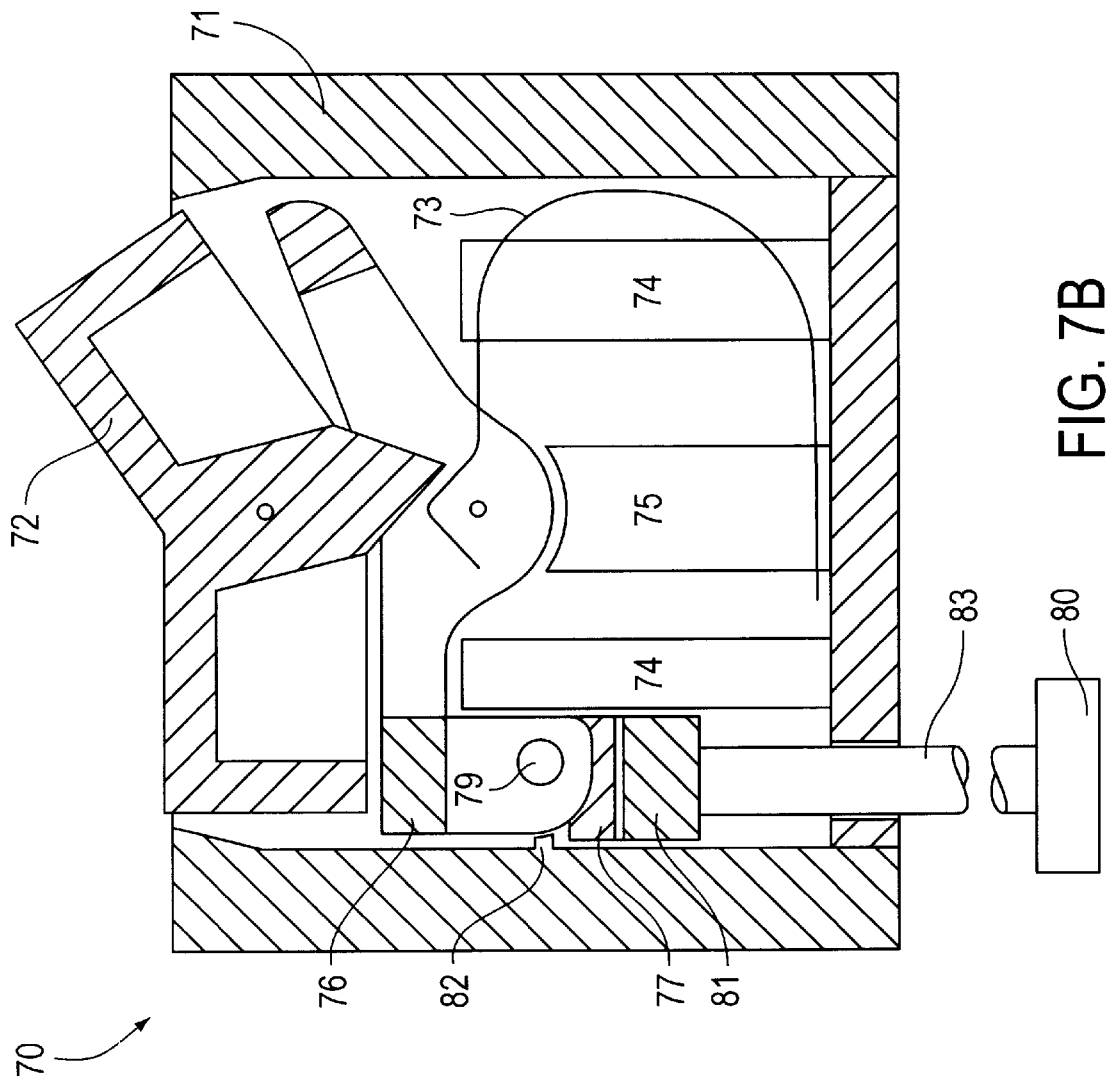
Figure 7C:
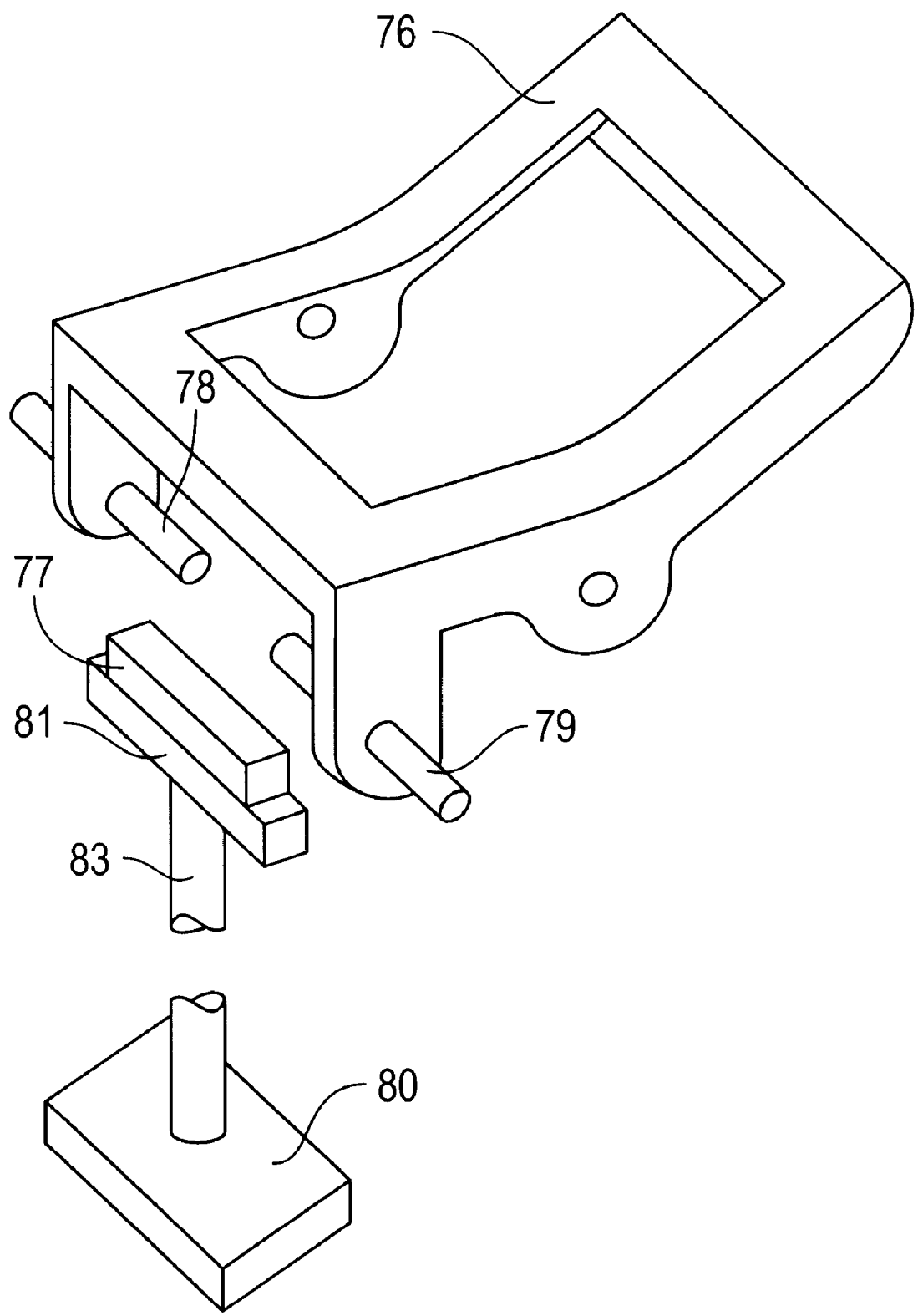

FIG. 7B is a cross sectional view of another alternative embodiment for a switch 70 according to the present invention. FIG. 7C is a perspective view illustrating the interaction of the contact carrying arm 76 and contact bar 77 of the switch 70. The switch 70 functions as both a tilt safety switch and as the on/off switch for the lamp.

Switch 70 includes a housing 71 with a rocker 72 mounted for external operation by a user. The rocker 71 is biased in the on or off position by spring 73 which is retained within housing 71 between stop ribs 74 and contact arm support post 75. Contact arm 76 carries two contacts 78 and 79. FIG. 7B illustrates the switch 70 in the on position, with rocker 72 holding contact end of arm 76 down toward contact bar 77 and contact bar 77 supported in the raised position by support 81 and foot 80. In the position illustrated, contact bar 77 connects contacts 78 and 79. If foot 80 is no longer supported by a supporting surface as described earlier, contact bar 77, attached to support 81 will move downward, away from contacts 78 and 79 breaking the connection between contacts 78 and 79. Contact bar 77 can be biased downward by the weight of the supporting assembly or by inclusion of a spring bias (not illustrated).

Leg 83 can be made to any desired length so that switch 70 can be conveniently mounted for a user, while maintaining foot 80 at the bottom of the lamp.

If the rocker 72 is set to the off position by a user, rocked to the right in FIG. 7B, the contact end of arm 76 is raised, separating contacts 78 and 79 from contact bar 77. Stop ledge 82 prevents contact bar 77 from further travel upward so that switch 70 is maintained in an off position.

The particular internal and external structure of the switches as illustrated and described herein is exemplary. Switches of varying construction can be utilized without departing from the scope of the invention, provided the switch is closed when the lamp rests on its base and the switch opens when the weight of the lamp is removed.

Figure 8:
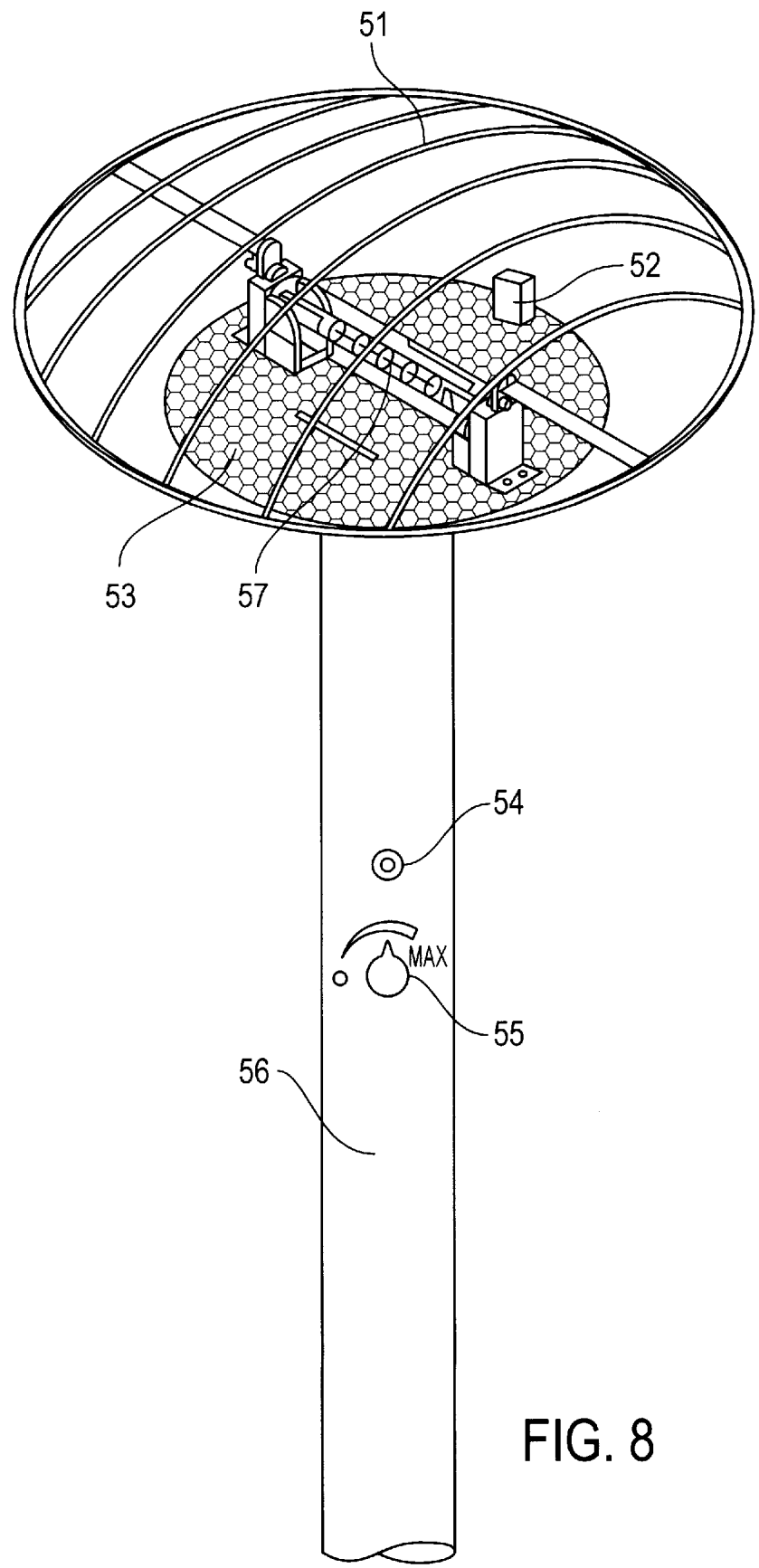
FIG. 8 is a perspective view of the upper portion of a halogen torchiere lamp.

FIG. 8 illustrates a halogen torchiere lamp as taught in patent application Ser. No. 08/672,416 no issued as U.S. Pat. No. 5,801,490. The lamp has a grid guard 51, a thermal sensor 52 mounted adjacent reflector 53, a photo-sensor 54 and a control switch 55 on stem 56. The control switch 55 is a potentiometer with an on/off switch which adjusts the power to the lamp bulb 57. The temperature response of sensor 52 is fixed as is the luminescence response of photo sensor 54. Interruption by the photo sensor 54 and the thermal sensor 52 is automatic not manual and cannot be adjusted by the user. The action point for implementation of either control is not adjustable.

Figure 9A:
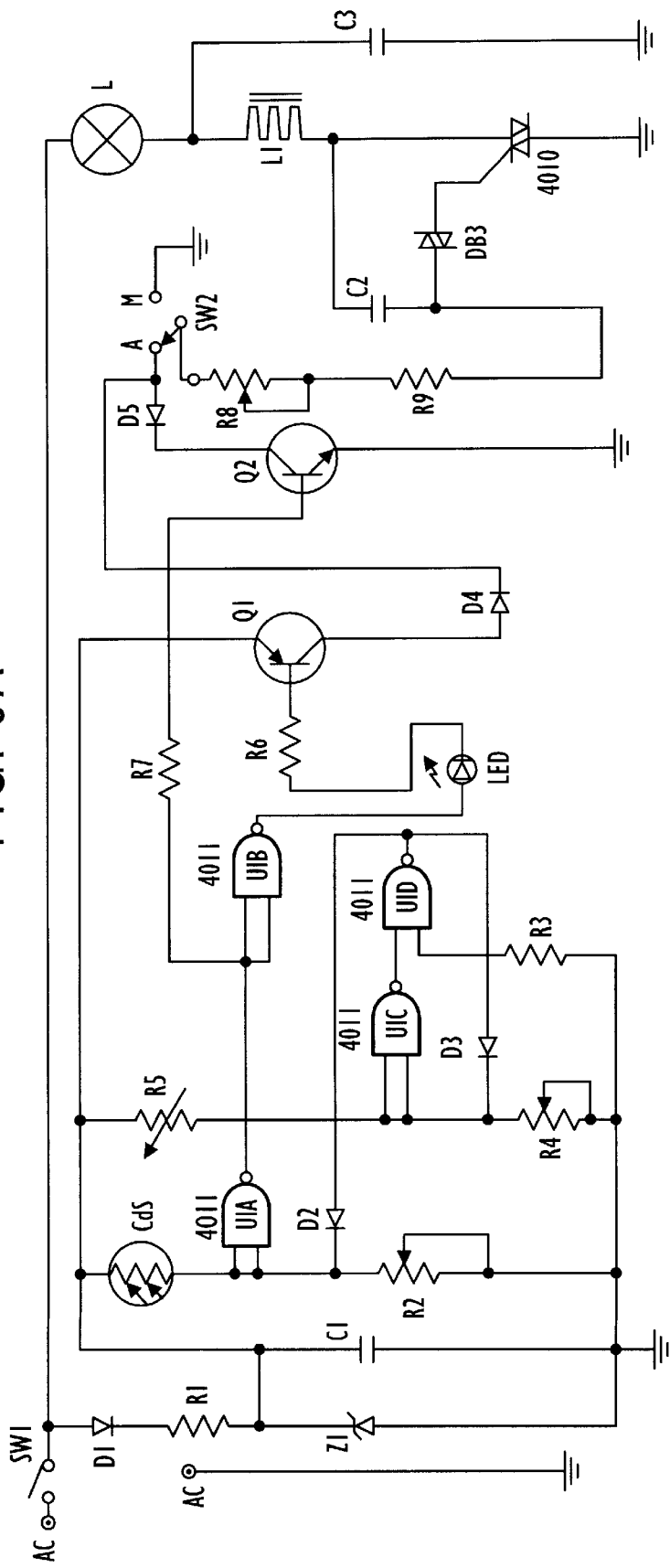
FIG. 9A is a circuit diagram of an exemplary embodiment of a temperature/luminescence control circuit of the invention.

FIG. 9A illustrates an exemplary circuit diagram for implementation of the thermal and optical control of the invention. The right side of FIG. 9A depicts the typical circuit of the prior art, including the lamp (300W/120V), the filter (L1 and C3), the triac (4010), the trigger diode (DB3), the capacitor (C2) and the potentiometer (R10).

Figure 10:
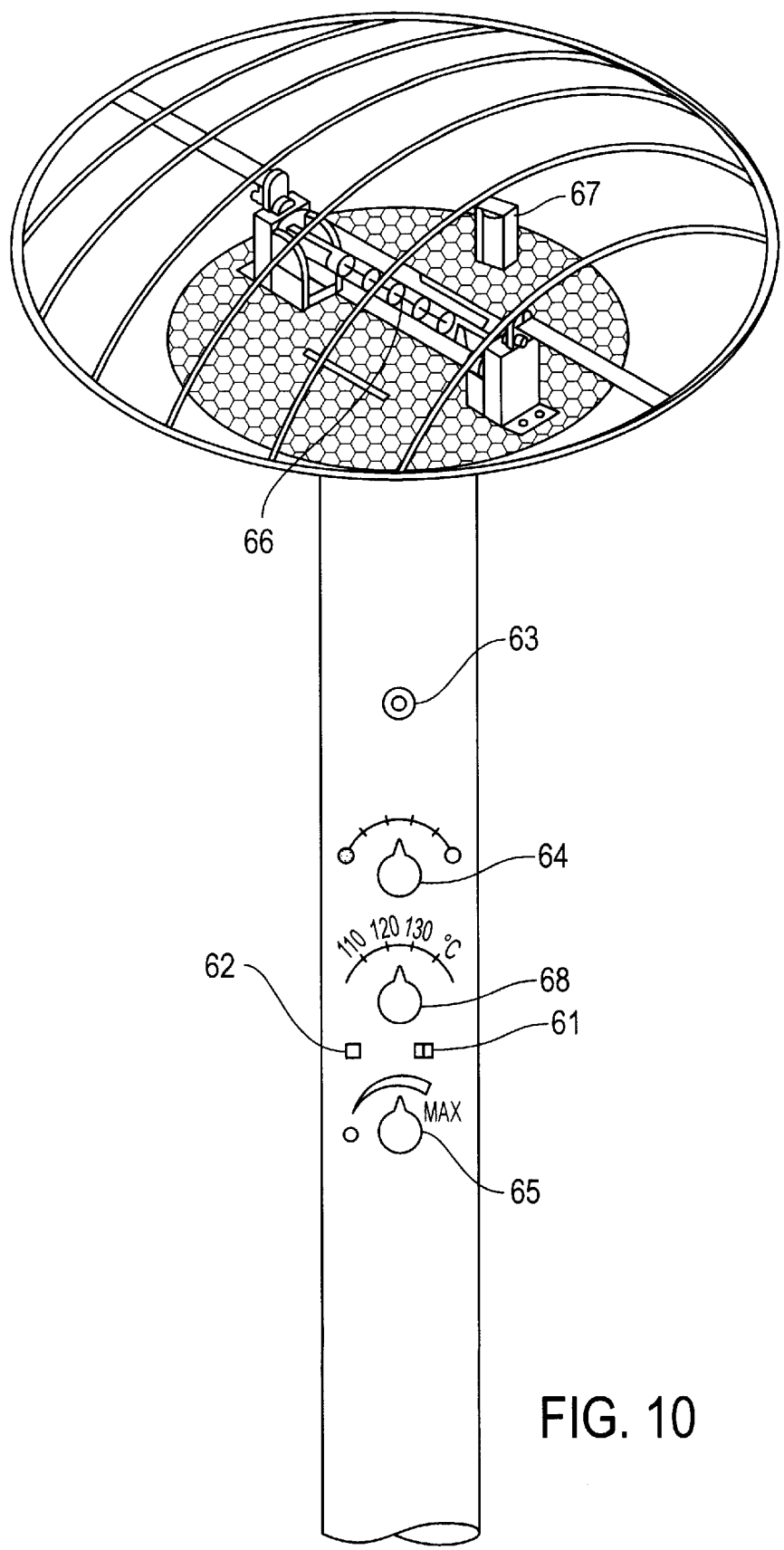
FIG. 10 is a perspective view of the upper portion of a lamp equipped with an exemplary embodiment of the invention.

The invention includes switch 61 (SW2) also illustrated in FIG. 10. When switch 61 is switched to the manual position, the lamp will act as a traditional dimmer controlled lamp. LED 62 of this inventive circuit, will show the user when a control condition has been sensed by the light control portion and/or the temperature control portion of the inventive circuit.

In the left side of FIG. 9A, from the top, the 120V AC current is led by a diode (D1), which acts as a half-wave rectifier, to a resistor (R1) for reducing the voltage to an acceptable level. Then, zener diode (Z1) is connected for ensuring that the reduced voltage is always 6V. Said rectified 6V DC is then further ensured by a capacitor (C1) for smoother wave-shape. R1 and C1 are also together referred to as a filter. The four components mentioned above comprise the DC power supply portion of this invention, providing smooth DC power.

Figure 9B:
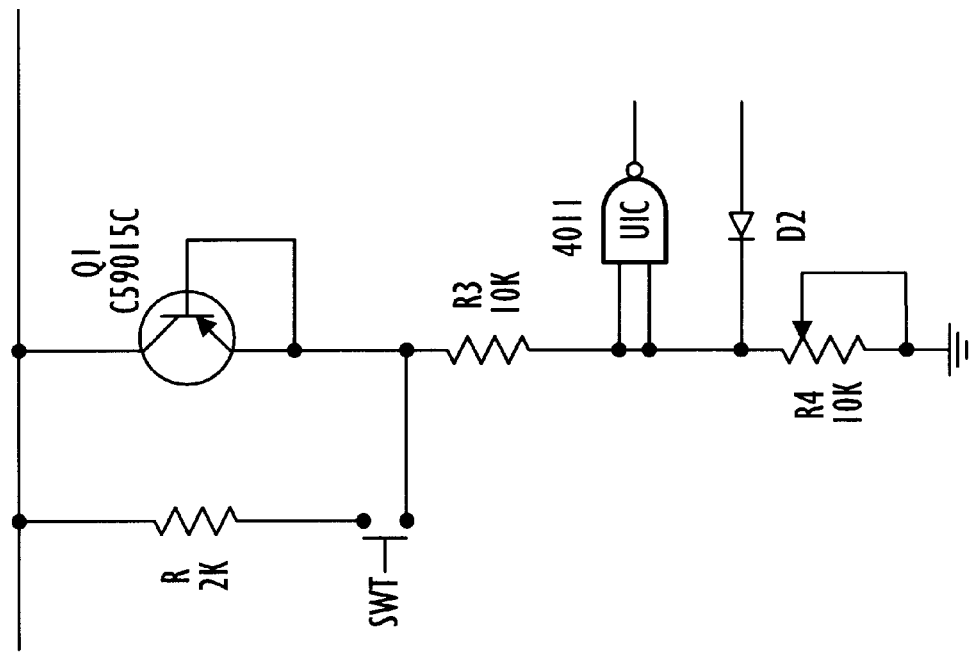
FIG. 9B is a partial circuit diagram of illustrating inclusion of the tip switch into an exemplary embodiment of a temperature/luminescence control circuit of the invention.
Figure 9C:
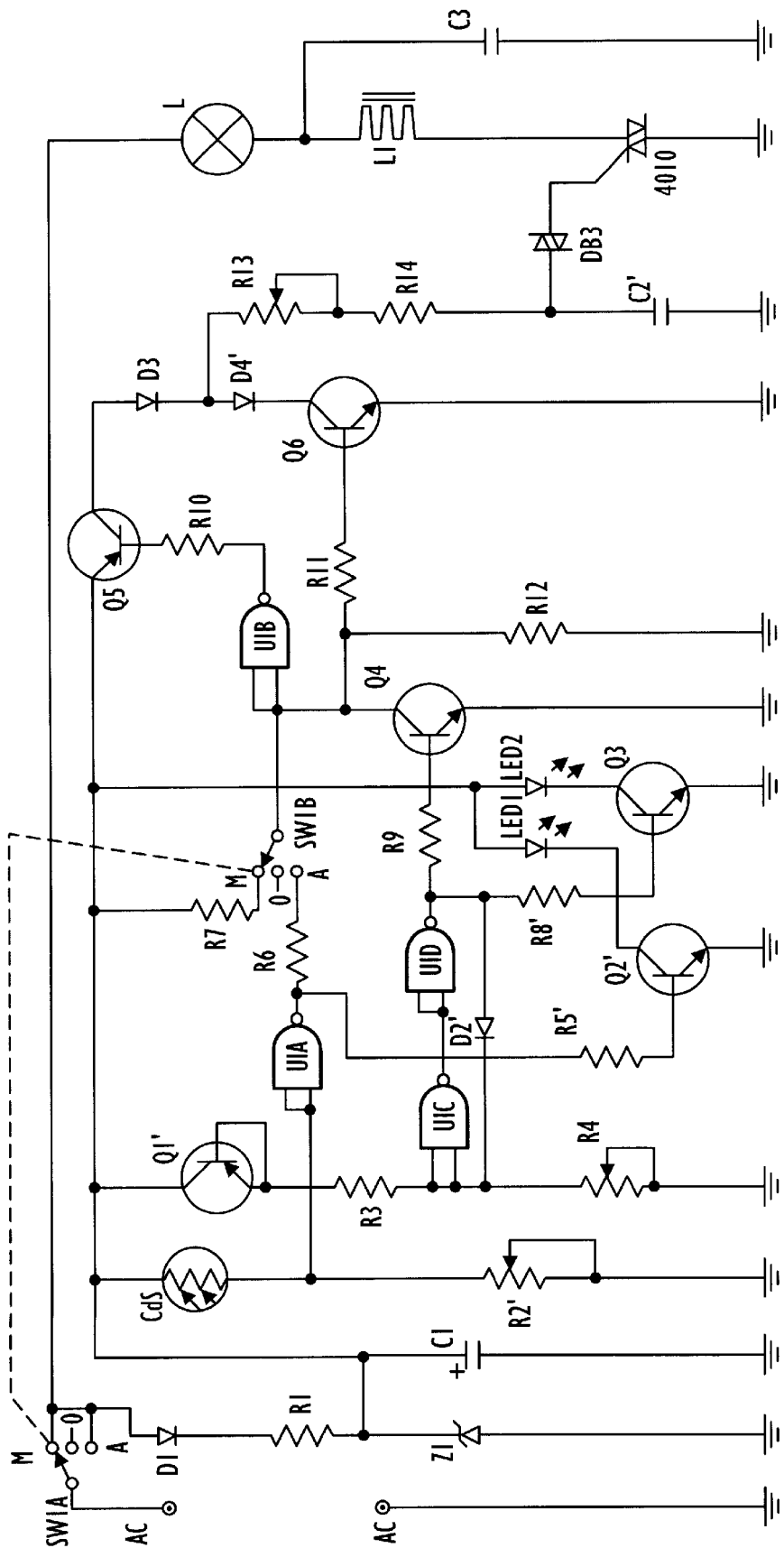
FIG. 9C is a circuit diagram of this invention.

In middle of FIG. 9(c), IC (U1D), transistors (Q3/Q5) and their accessories form the electronic switch portion of this invention. U1D acts as a phase-reverser and also controls two transistors (Q3/Q5). When transistors (Q3/Q5) are in CUT condition, R10 has the highest voltage level and the triac is switched ON. When transistors (Q3/Q5) are in PASS condition, R10 has the lowest voltage level and the triac is switched OFF. LED 62 is connected to the output end of U1D in order to show the action signals from either the light control portion or the temperature control portion in both Auto and Manual modes. Without the indication of LED 62, the user does not know what temperature has been reached, no manual control can be carried out.

Figure 11:
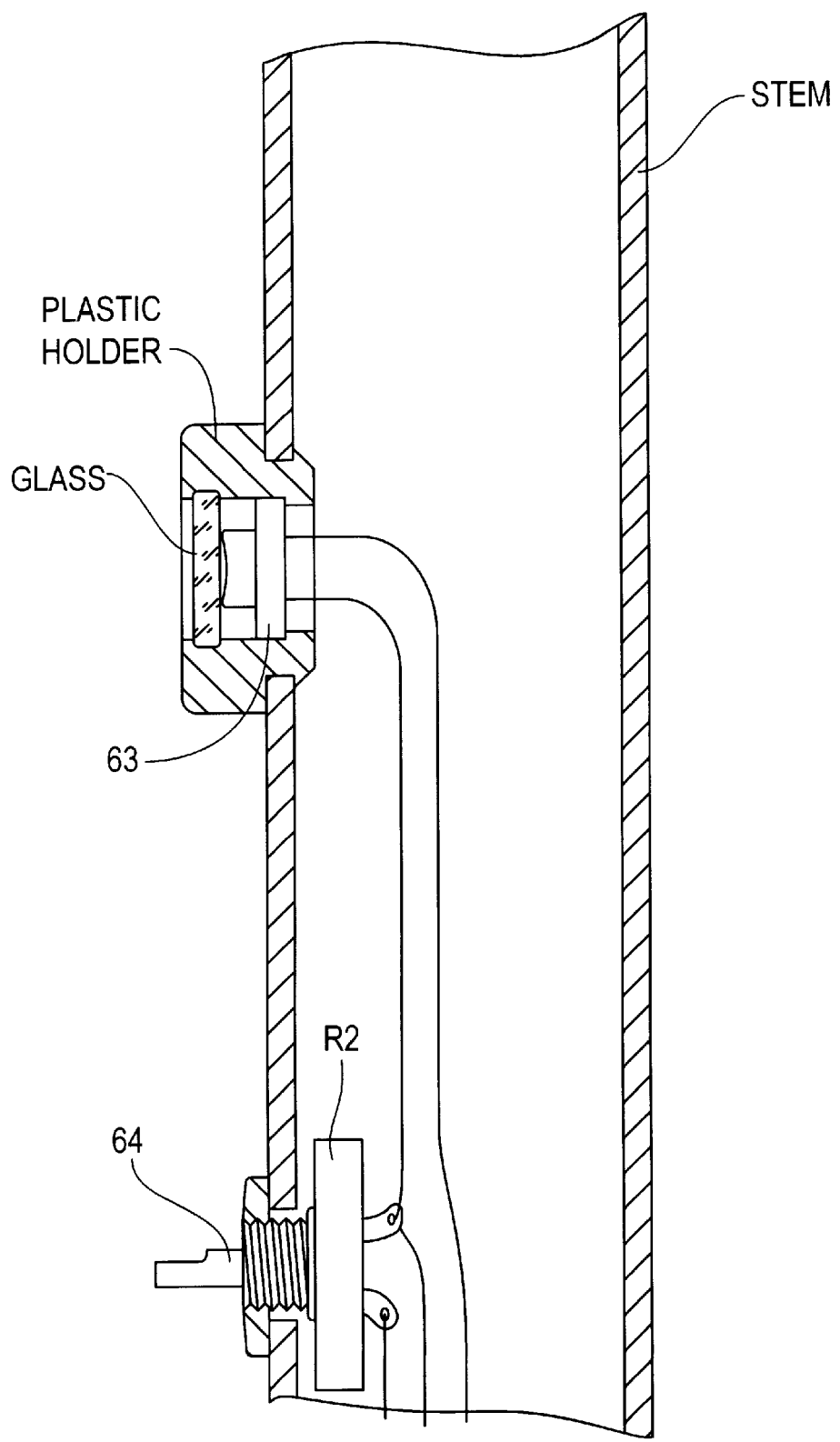
FIG. 11 is a cross-sectional view of the light-sensing system of the invention illustrated in FIG. 10.
Figure 13:
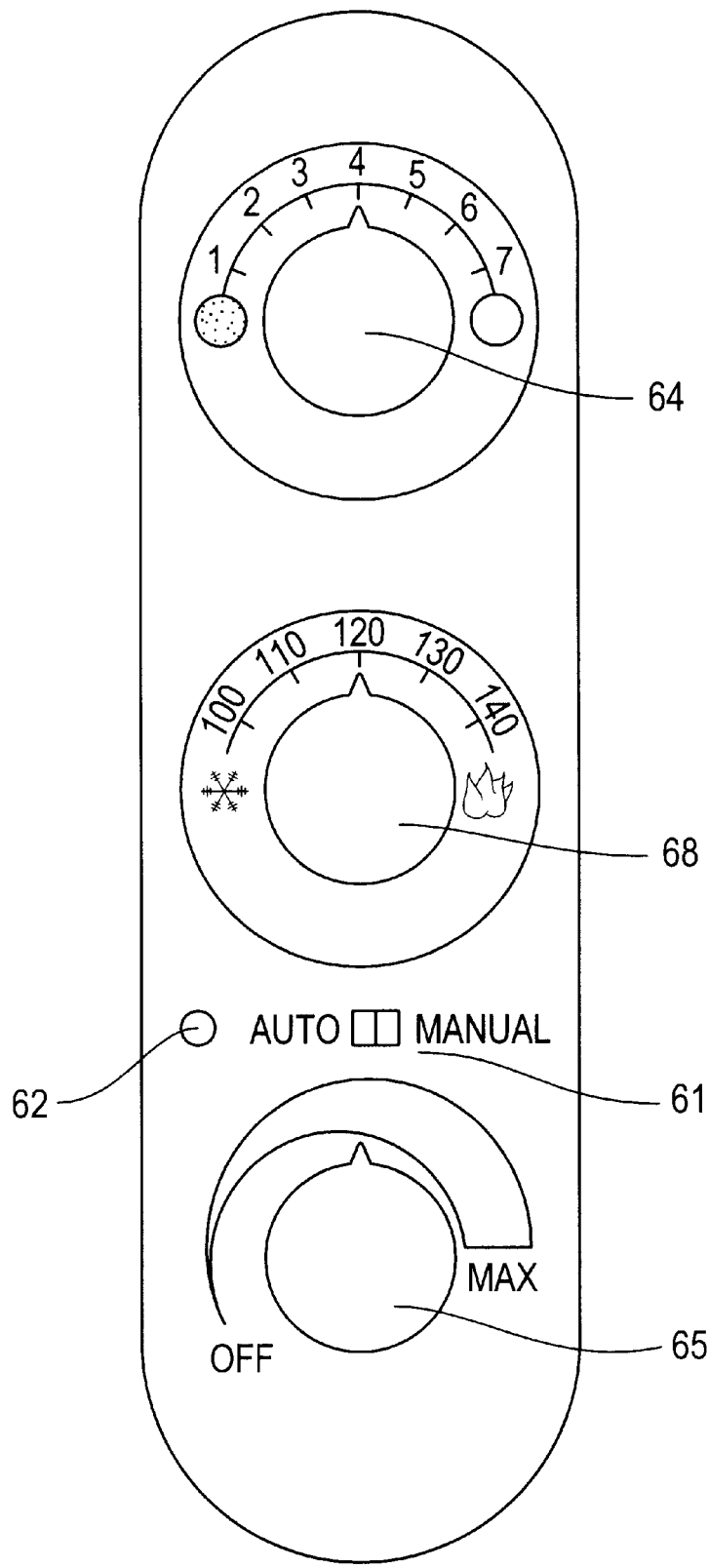
FIG. 13 illustrates an exemplary control panel for the invention.

The light control portion of this invention comprises a photoresistor (CdS), an IC (U1A) and a potentiometer (R2). Referring to FIG. 10, FIG. 11 and FIG. 13, the photo-sensor 63 and its location are clearly shown. In this exemplary embodiment, the function of the light control system of this invention is designed as follows: the photo-sensor 63 is oriented to be subject to normal ambient light under normal operating conditions, including facing any item to be illuminated by the lamp. R2, which is connected to light control knob 64, can be adjusted by the user to any intended position. In normal use, when the referenced object is dark or not bright enough, the photo-resistor 63 (CdS) has a high level of resistance. Therefore, the input of U1A is at a low level and the output of U1A is at a high level, thus causing the electronic switch to be ON. When the reference object is bright enough, the photoresistor 63 (CdS) has a low level of resistance. Therefore, the input of U1A is at the high level and the output of U1A is at the low level, thus causing the electronic switch to be OFF. In normal use, the photo-sensor 63 must be placed in a position such that only the reference luminous object can affect the photo-sensor 63.

A user can set or adjust the luminescence set point or action point of the lamp of the present invention in the following manner. The light control knob 64 (which adjusts R2 in FIGS. 9A/9B) is first set to the maximum light position, see FIG. 13. Next illuminate the reference object and aim the photo-sensor 63 at the reference object. Then, adjust R2, knob 64, until the light control portion acts to reduce the illumination from bulb 66. If the reference object is too bright, the fine-adjustment of R2 will have no response. Thus, it is necessary to find another reference object as the new reference object. The lamp will be automatically switched ON once the reference object becomes dark.

Figure 12:
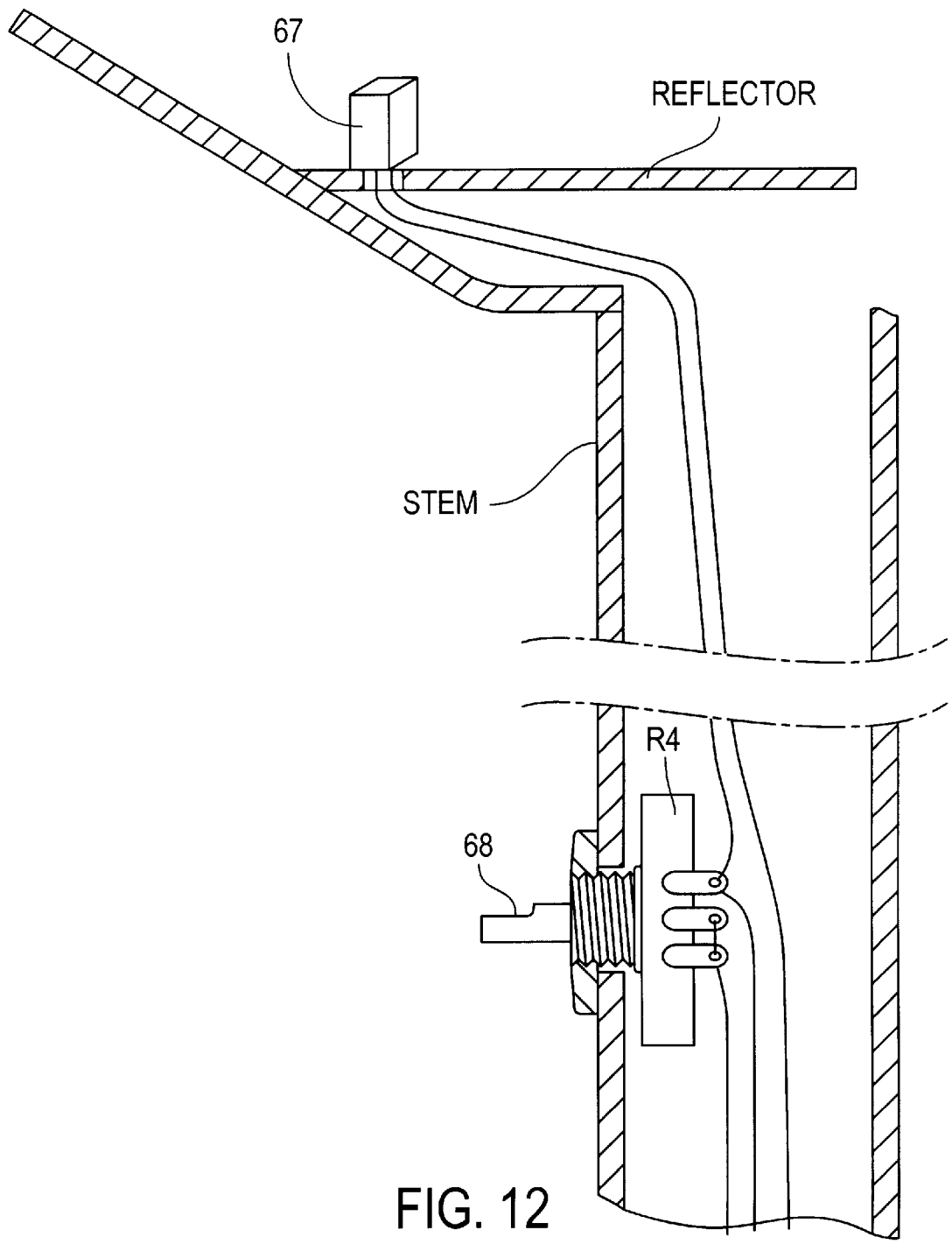
FIG. 12 is a cut away view illustrating the temperature sensor location and temperature sensing circuit of the invention.

Referring again to FIG. 9A, the temperature control portion of this invention includes thermal resistor (R7), also illustrated as 67 in FIGS. 10 and 12, two IC's (U1C/U1B), a potentiometer (R4), adjustable by temperature control knob 68, FIGS. 10, 12 and 13, and their accessories. The installation of the thermal sensor is clearly disclosed in the patent application Ser. No. 08/872,416 filed Jun. 10, 1997, issued Sep. 1, 1998 as U.S. Pat. No. 5,801,490 by the same inventor, the specification of which is incorporated herein by reference.

The circuit of the present invention allows for the thermal set point or thermal action point to be adjusted by user.

Potentiometer (R4) can be adjusted by the user in order to obtain a range of action points, for example, 130C, 120C, 110C and any temperatures in between. In addition, without the present invention applications, the thermal heating/cooling, ON/OFF cycle will repeat continuously until someone switches the lamp OFF. In this invention, however, when the thermal sensor 67 senses an unsafe temperature increase of the lamp, the power is automatically cut off, and the lamp will remain in the OFF condition until someone re-starts the lamp using SW1, operated by control knob 65. Control 65 also operates potentiometer R10.

When the power switch (SW1) is first switched ON, the whole lamp is cool, therefor thermal resistor 67 (R7) has a high resistance. Therefore, the input level of U1C is low. Thus, the output level of U1C is high, and the output level of U1B is low. When the temperature of the lamp rises to the action point, the resistance of the thermal resistor 67 (R7) becomes small, and the input level of U1C becomes high enough to turn over. Thus, the output level of U1C becomes low and the output level of U2A becomes high. Such high output level of U1B passes through D6 to the input end of U1C giving U1C a continuous low level output. At the same time, the high level output of U1B passes through D5 to the input end of U1A and turns the electronic switch OFF.

Therefore, even if the temperature of the lamp becomes low again, because the input end of U1C is now controlled by the high level output of U2A and not by thermal resistor 67(R7), the lamp will remain in the OFF condition unless someone switches the power switch (SW1) OFF and then switches it ON to start a new cycle. This novel "lock" function provides complete thermal protection for the Lamp. Without diode D6, this temperature control portion can act as does the device in the inventor's co-pending application, lamp OFF when the temperature reaches the action point, lamp ON when the temperature cools down to the re-setting point. The light control does not include a "lock" function because no safety problem is involved in the light control portion.

FIG. 9B illustrates the inclusion of a tip over switch, SWT, as described above into the control circuitry of FIG. 9A. The switch SWT does not need to make and break full current to the lamp but instead can operate with low DC voltage and low Dc current to shut off power to the lamp bulb.

Although the invention has been described in conjunction with the foregoing specific embodiment, many alternatives, variations and modifications will be apparent to those of ordinary skill in the art. Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense. Those alternatives, variations and modifications are intended to fall within the spirit and scope of the appended claims.

We claim:

1. In a lamp having a base, a bulb and an electrical source for illuminating the bulb, wherein said base supports said lamp on a supporting surface, the improvement comprising:
a switch mounted to said base on an underside of a rim of said base, positioned between said base and said supporting surface and electrically connected between said bulb and said electrical source and having a first electrically conducting state and a second electrically isolating state, wherein said switch is maintained in said first electrically conducting state by the compression from the weight of said base on said supporting surface.

2. The lamp of claim 1, further including:
a foot attached to said actuating member and providing greater surface area of contact with said supporting surface.

3. The lamp of claim 1, further including:
a force element attached to said switch for biasing said switch into said second electrically isolating state when the compression from the weight of said base is removed.

4. The lamp of claim 1, further including:
an actuating member attached to said switch in contact with said supporting surface.

5. The lamp of claim 4, wherein said actuating member is positioned near the center of said base.

6. The lamp of claim 1, further comprising a plurality of switches mounted along said underside rim of said base.

7. The lamp of claim 6, wherein said switches being connected in series.

8. In a lamp having a base, a bulb and an electrical source for illuminating the bulb, wherein said base supports said lamp on a supporting surface, the improvement comprising:
a switch mounted to said base and in contact with said supporting surface when said lamp is in a first upright position, wherein said switch breaks contact with said supporting surface when said lamp is disturbed from said upright position, further including a plurality of switches positioned around the edge of said base.

9. A lamp bulb control device for a lamp, comprising:
a power circuit for providing power to said lamp bulb;
a switch circuit operatively connected to said power circuit to regulate the power flow through said power circuit;
a control circuit operatively connected to said switch circuit for sensing the lamp parameters of temperature, luminescence, and orientation and for controlling the state of said switch circuit based upon said sensed parameters, and wherein
said orientation sensing portion of said control circuit includes a switch mounted to an underside of a rim of a base of said lamp, positioned between said base and a supporting surface and electrically connected between said bulb and an electrical source and having a first electrically conducting state and a second electrically isolating state, wherein said switch is maintained in said first electrically conducting state by the compression from the weight of said base on said supporting surface.

10. An electronic control device for a lamp, comprising:
an electronic dimmer circuit;
an electronic switch circuit operatively connected to said electronic dimmer circuit to regulate the output of said electronic dimmer circuit;
a temperature sensing circuit operatively connected to said electronic switch circuit to operate said electronic switch circuit dependent upon sensed temperature; and
an adjustment circuit operatively connected to said temperature sensing circuit to adjust the sensitivity to said temperature.

11. The electronic control circuit of claim 10, further comprising:
a light sensing circuit operatively connected to said electronic switch circuit to operate said electronic switch circuit dependent upon sensed luminescence; and a second adjustment circuit operatively connected to said light sensing circuit to adjust the sensitivity to said luminescence.

12. A control device for a lamp having a base, a bulb and an electrical source for illuminating the bulb, an electronic dimmer circuit between said electrical source and said bulb for controlling the current from said source to said bulb, wherein said base supports said lamp on a supporting surface, comprising:

a switch operatively, electrically connected between said electrical source and said electronic dimmer circuit and mounted to said base in contact with said supporting surface when said lamp is in a first upright position, wherein said switch breaks contact with said supporting surface when said lamp is disturbed from said upright position and isolates said electronic dimmer circuit from said electrical source;

an electronic switch circuit operatively connected to said electronic dimmer circuit to regulate the output of said electronic dimmer circuit;

a temperature sensing circuit operatively connected to said electronic switch circuit to operate said electronic switch circuit dependent upon sensed temperature;

an adjustment circuit operatively connected to said temperature sensing circuit to adjust the sensitivity to said temperature.

13. The control device of claim 12, further comprising:

a light sensing circuit operatively connected to said electronic switch circuit to operate said electronic switch circuit dependent upon sensed luminescence; and a second adjustment circuit operatively connected to said light sensing circuit to adjust the sensitivity to said luminescence.

* * * * *